(12) United States Patent
Irubetagoyena et al.

(10) Patent No.: US 9,105,199 B2
(45) Date of Patent: Aug. 11, 2015

(54) DEVICE FOR SIMULATING AN ALTERNATOR, METHOD OF CONTROLLING SUCH A DEVICE AND SIMULATION SYSTEM COMPRISING SUCH A DEVICE

(75) Inventors: Patrick Irubetagoyena, Toulouse (FR); Eric Resseguier, Colomiers (FR); Herve Mercadal, Pujaudran (FR); Nicolas Bouisset, Toulouse (FR)

(73) Assignee: AIRBUS Operations S.A.S., Toulouse (FR)

( * ) Notice: Subject to any disclaimer, the term of this patent is extended or adjusted under 35 U.S.C. 154(b) by 159 days.

(21) Appl. No.: 13/371,863

(22) Filed: Feb. 13, 2012

(65) Prior Publication Data

US 2012/0205991 A1 Aug. 16, 2012

(30) Foreign Application Priority Data

Feb. 14, 2011 (FR) ...................................... 11 51191

(51) Int. Cl.
*H01H 47/00* (2006.01)
*G09B 23/18* (2006.01)
*G09B 25/02* (2006.01)

(52) U.S. Cl.
CPC .............. *G09B 23/188* (2013.01); *G09B 25/02* (2013.01)

(58) Field of Classification Search
USPC ......... 323/201, 204; 318/140; 322/25, 39, 47, 322/59, 61
See application file for complete search history.

(56) References Cited

U.S. PATENT DOCUMENTS

| | | | |
|---|---|---|---|
| 3,789,281 A | 1/1974 | Shibata | |
| 4,629,430 A | 12/1986 | Sakamoto | |
| 4,751,978 A * | 6/1988 | Drutchas et al. | 180/446 |
| 5,281,905 A * | 1/1994 | Dhyanchand et al. | 322/32 |
| 5,905,357 A * | 5/1999 | Kawasaki | 320/104 |
| 5,982,155 A * | 11/1999 | Rechdan et al. | 322/36 |
| 7,336,462 B2 * | 2/2008 | Raichle et al. | 361/93.1 |
| 7,680,642 B2 * | 3/2010 | Hashimoto et al. | 703/14 |
| 2006/0086547 A1 * | 4/2006 | Shimada et al. | 180/65.4 |
| 2009/0134723 A1 * | 5/2009 | Takeuchi | 310/48 |

FOREIGN PATENT DOCUMENTS

DE 42 04 735 A1 9/1993
FR 2 140 017 1/1973

OTHER PUBLICATIONS

French Preliminary Search Report issued May 20, 2011, in French 1151191, filed Feb. 14, 2011 (with English Translation of Categories of Cited Documents).

* cited by examiner

*Primary Examiner* — Emily P Pham
(74) *Attorney, Agent, or Firm* — Oblon, McClelland, Maier & Neustadt, L.L.P.

(57) ABSTRACT

A device (10) for simulating an alternator is connected to an alternator control circuit (20) and supplies a voltage on an electrical network (30). This device comprises: a circuit for receiving an excitation current ($I_{exc}$) generated by the control circuit (20); a switch (15) able to apply voltage to the network (30) and controlled on the basis of the excitation current ($I_{exc}$). A method of controlling such a device and a simulation system comprising such a device also are described.

20 Claims, 3 Drawing Sheets

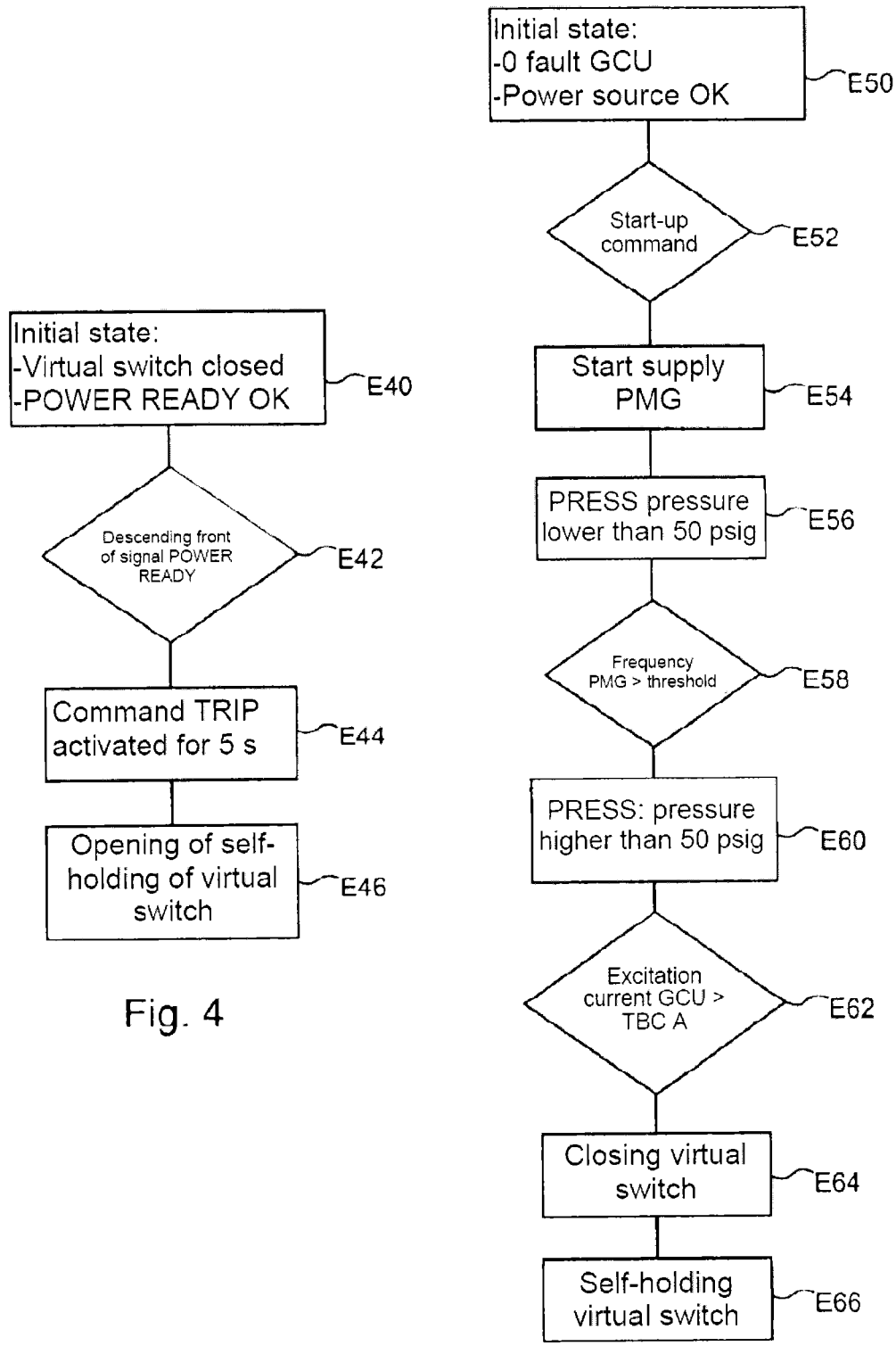

DEVICE FOR SIMULATING AN ALTERNATOR, METHOD OF CONTROLLING SUCH A DEVICE AND SIMULATION SYSTEM COMPRISING SUCH A DEVICE

The invention relates to a device for simulating an alternator, a method for controlling such a device as well as a simulation system comprising such a device.

Simulation systems, used for example in the aeronautical field, are intended for testing a real equipment item of an installation in an environment separate from the normal operating environment of the equipment item, but the performance of which considered from the equipment item is as close as possible to that of the normal environment.

When it is wished to conduct a simulation, it thus is necessary to provide for the power supply that will allow the switching on and therefore the operation of the equipment items to be tested.

Of course it is possible to generate this power supply with systems identical or similar to those used in the installation (for example the aircraft) to be simulated.

It is desirable, however, in particular to reduce the costs of the simulation and especially when supply for several equipment items to be tested must be implemented, to provide for supply systems which are themselves also separate from the real systems but simulate the operation thereof.

In this context, the invention proposes a device for simulating an alternator able to be connected to an alternator control circuit and to supply a voltage on an electrical network, characterized in that it comprises a circuit for receiving an excitation current generated by the control circuit; and a switch able to apply voltage to the network and controlled on the basis of the excitation current.

In this way such a device is able to simulate the operation of an alternator, particularly with regard to its interaction with the control circuit.

In practice, provision may be made to use a current sensor able to measure the excitation current and a command module able to control the switch according to the measured current.

The command module then, for example, may be designed for commanding the closing of the switch when the excitation current exceeds a predetermined threshold.

The device further may comprise an inductive circuit to which the excitation current, which takes part in the simulation of operation of the alternator, particularly its inductive performance, is applied.

Provision also may be made for means for delivery of a variable voltage intended for an input of the control circuit allowing determination of the excitation current. In this way the signals generated back to the control circuit may be simulated.

In terms of method, the invention proposes a method for controlling a device for simulating an alternator able to be connected to an alternator control circuit and to supply a voltage on an electrical network, characterized by the following steps:

receiving an excitation current generated by the control circuit;
controlling a switch able to apply the voltage to the network on the basis of the excitation current.

Closing of the switch is commanded, for example, when the excitation current exceeds a predetermined threshold.

Finally, the invention proposes a simulation system comprising a simulation device as indicated above and the control circuit, in which the control circuit comprises a module for determining the excitation current according to a value representative of a voltage received at the input of the control circuit.

In practice, the simulation device may be set up to supply a first equipment item.

It then may be provided that the simulation device is connected to the first equipment item through a switching box and that an alternator is connected to a second equipment item through the switching box.

Other characteristics and advantages of the invention will come to light from the description that follows, presented with reference to the attached drawings in which:

FIG. 4 shows the steps for opening the virtual switch of FIG. 3;

FIG. 5 shows the steps for closing the virtual switch of FIG. 3.

Figure 1:
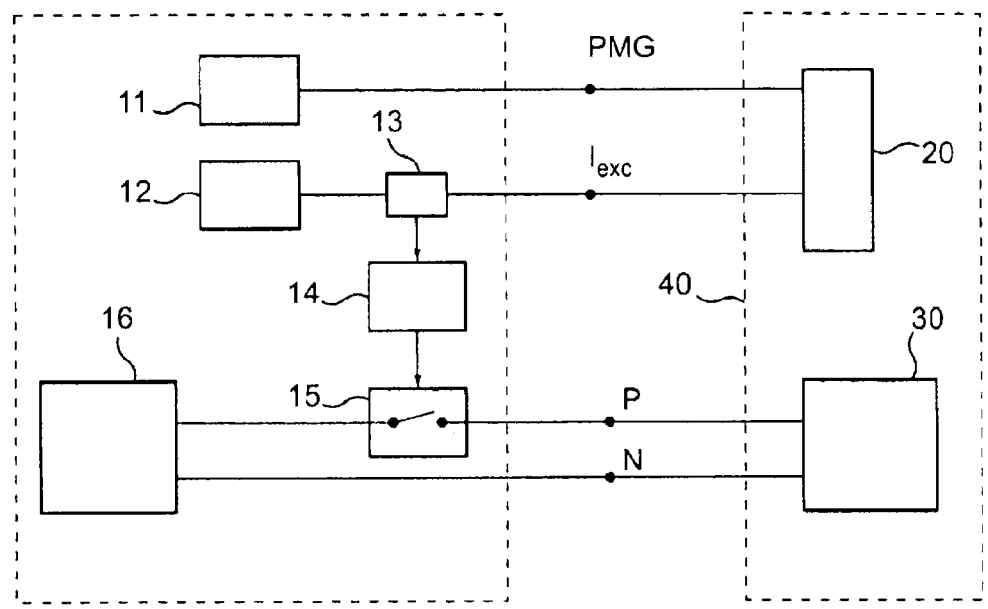
FIG. 1 shows the main components of an exemplary device for simulating an alternator in accordance with the teachings of the invention.

FIG. 1 shows a device for simulating an alternator 10 intended to provide a supply to an electrical power center 30 of a real equipment item to be tested 40.

This real equipment item 40 also comprises a control circuit 20, to run the operation of the alternator that supplies this intended real equipment item 40 during normal operation thereof.

Simulation device 10 comprises a variable voltage generator 11 connected to an input PMG of control circuit 20 intended to receive in real operation the voltage generated by a permanent-magnet generator (fastened onto the rotor of the alternator) and which therefore is proportional to the frequency of rotation of the alternator.

Variable voltage generator 11 is programmed to generate a voltage ramp having a rising amplitude (for example between 20 V and 120 V) and a simultaneously rising frequency (for example between 200 Hz and 1200 Hz), typically activated by the reception of a high level on an input (not shown) of generator 11, and a descending ramp (for example between 120 V and 20 V), typically upon reception of a low level on this same input.

Simulation device 10 also comprises an inductive circuit RL 12 connected to an output $I_{exc}$ of control circuit 20 intended to deliver in real operation an excitation current to an excitation winding situated at the stator of the exciter for the alternator and thus to regulate the voltage at the output of the alternator.

In this way circuit RL 12 makes it possible to simulate the inductive performance of the alternator. A resistance with value 10Ω and an inductance value of 20 mH are used, for example, in circuit RL 12.

Simulation device 10 further comprises a current sensor 13 situated between circuit RL 12 and the connection to output $I_{exc}$ of control circuit 20. In this way current sensor 13 measures excitation current $I_{exc}$ injected by control circuit 20 into circuit RL 12 and delivers the measurement made to a command module 14.

A supply module 16 (shown as integrated into simulation device 10, but possibly external to this device) generates a voltage (of the same type as that generated in real operation by the alternator, for example a three-phase voltage of 235 VAC and 400 Hz) between a neutral terminal N and at least one phase terminal P of electrical power center 30.

A controlled switch 15 is interposed between supply module 16 and electrical power center 30 (for example between phase input P of electrical power center 30 and the corresponding output of supply module 16) so as to selectively supply or not supply electrical power center 30 through the voltage generated by supply module 16.

Controlled switch 15 is opened or closed according to a command generated by command module 14, on the basis, in particular, of the excitation current measured by sensor 13 as subsequently explained in greater detail.

In particular, controlled switch 15 (also called "virtual switch") here is closed by the command of command module 14 when the excitation current measured by sensor 13 exceeds a predetermined threshold (for example 2A RMS) and is opened for example upon reception by command module 14 of a dedicated information item (not shown) originating from control circuit 20.

Figure 2:
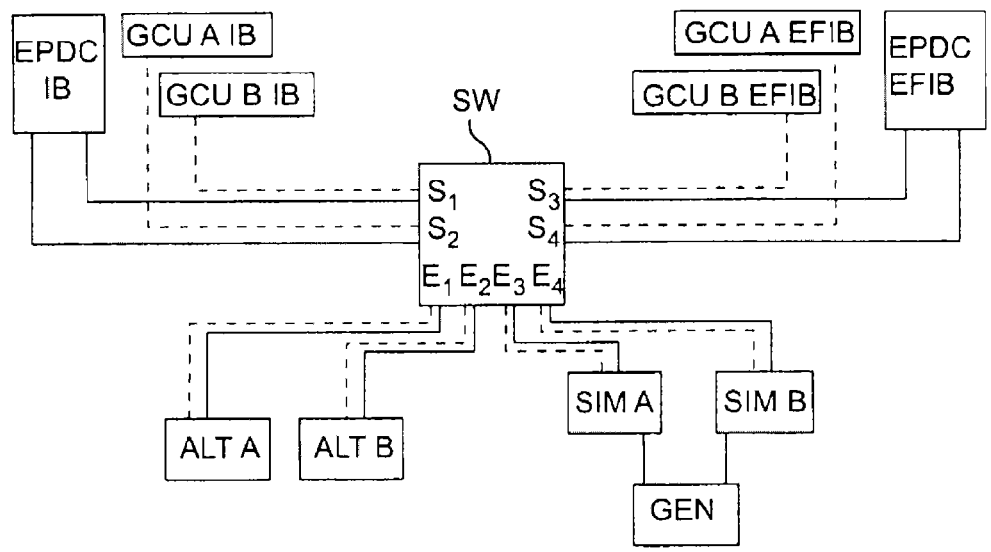
FIG. 2 shows a simulation system comprising a device of the type of the one illustrated on FIG. 1.

FIG. 2 shows a simulation system in which a device of the type of that which has just been described with reference to FIG. 1 is used.

On this Figure, each solid line represents a series of connections (mainly of cables) for supply, (which therefore carries voltages for supply of the various devices to be tested) and each dotted line represents a series of connections (mainly of cables) intended to carry signals exchanged between the equipment items.

The simulation system comprises a first alternator ALT A and a second alternator ALT B which therefore each constitute a real equipment item for generating a variable frequency voltage.

First alternator ALT A is connected (by power or supply connections as well as by connections conveying signals) to a first input $E_1$ of a switching box SW the function of which is described below.

Similarly, second alternator ALT B is connected (by supply connections as well as by connections relating to conveyance of signals) to a second input $E_2$ of switching box SW.

A generator GEN (fulfilling the function of supply module 16 of FIG. 1) delivers one or more voltages on the one hand to a first simulation box SIM A and on the other hand to a second simulation box SIM B.

Each of the first and second simulation boxes SIM A, SIM B is a simulation device such as simulation device 10 shown on FIG. 1. The architecture of each of these simulation boxes furthermore is subsequently described in greater detail.

First simulation box SIM A is connected to a third input $E_3$ of switching box SW. Similarly, second simulation box SIM B is connected to fourth input $E_4$ of switching box SW.

Switching box SW comprises a series of switches which make it possible (based on a manual command) to connect the cables arriving on one of the inputs $E_i$ to corresponding cables exiting on one of the outputs $S_i$ of four outputs $S_1$, $S_2$, $S_3$, $S_4$.

The supply cables of outputs $S_1$ and $S_2$ are connected to the electrical power center (here designated as EPDC) of a first equipment item (here designated as IB). It is noted that two separate supplies are provided to the electrical power center according to the principle of redundancy used in certain installations, particularly aircraft.

As for the cables carrying signals from output $S_1$, they are connected to a first control circuit GCU B of first equipment item IB while the cables carrying signals from second output $S_2$ are connected to a second control circuit GCU A of first equipment item IB. Redundancy of equipment items also is made possible here.

In the same way, the supply cables from outputs $S_3$ and $S_4$ are connected to electrical power center EPDC of a second equipment item EFIB. The cables carrying signals from output $S_3$ are connected to first control circuit $GCU_B$ of second equipment item EFIB and the cables carrying signals from output $S_4$ are connected to a second control circuit $GCU_A$ of second equipment item EFIB.

It is noted that the four control circuits GCU A IB, GCU B IB, GCU A EFIB, GCU B EFIB are circuits of the type of the control circuit referenced 20 on FIG. 1.

It is understood that switching box SW makes it possible to combine one of the supplies of the two real supplies ALT A, ALT B and the two simulated supplies SIM A, SIM B as supply necessary either for operation of the first equipment item, or for operation of the second equipment item (each equipment item needing two separate supplies for redundancy).

The use of two simulation boxes SIM A, SIM B thus makes it possible to test the entire system (namely the first and the second equipment items) having recourse to only two real supplies (here alternators ALT A and ALT B).

Figure 3:
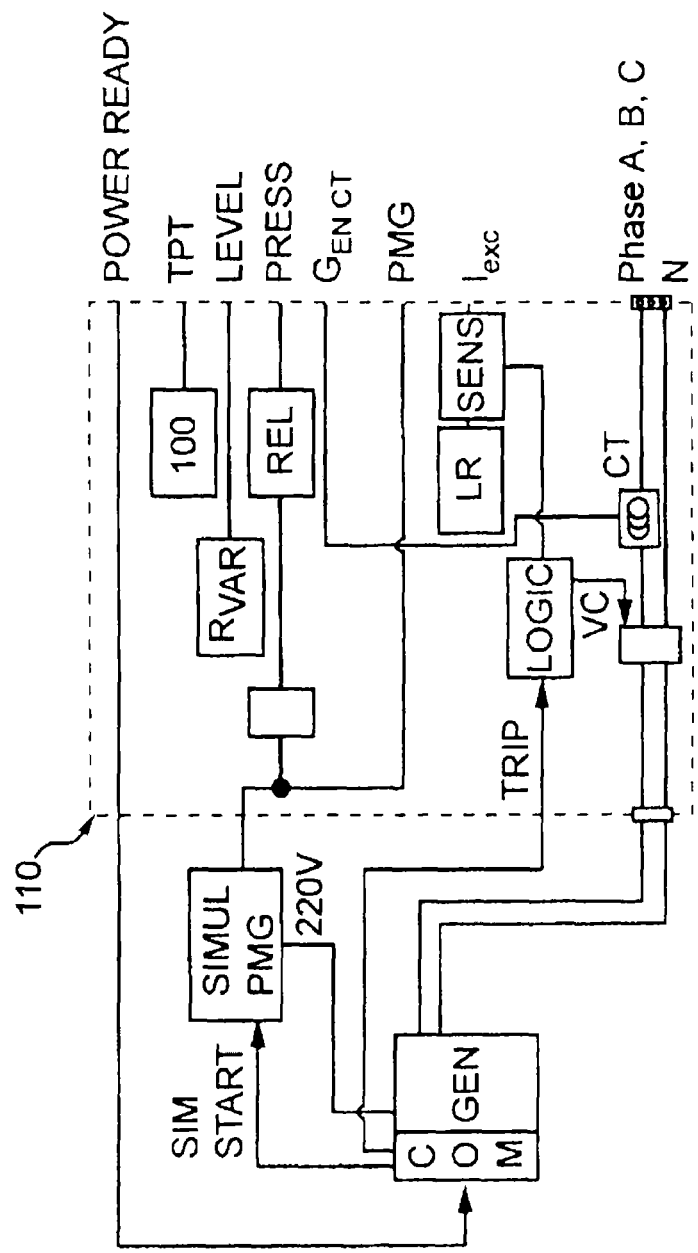
FIG. 3 shows in detail a simulation device of FIG. 2.

FIG. 3 shows an exemplary simulation device in accordance with the teachings of the invention. Simulation devices SIM A, SIM B of FIG. 2, for example, are implemented in accordance with this FIG. 3.

Simulation device 110 shown on FIG. 3 first of all receives a signal from a variable voltage generator SIMUL PMG (not integrated into the simulation device in this example and which corresponds to generator 11 of FIG. 1) and directly transmits the signal received from this generator SIMUL PMG on a PMG output.

The voltage signals generated by generator SIMUL PMG (particularly the voltage ramps as already mentioned with regard to generator 11 on FIG. 1) are activated on the basis of a signal SIM START generated by a command module COM.

Simulation device 110 comprises a frequency detector F which measures the frequency of the signal PMG simulated by generator SIMUL PMG. A relay REL, connected to an output indicative of a low level of oil pressure, is driven (that is to say opened or closed) according to the frequency measured by frequency detector F, which makes it possible to simulate a signal PRESS indicative of a low oil pressure (intended for control circuit GCU) when the frequency of the voltage PMG is lower than a threshold and a signal PRESS indicative of a normal operating pressure when the measured frequency is higher than this threshold.

Simulating device 110 further comprises a module for simulating a variable resistance $R_{VAR}$ (implemented for example on the basis of relays and a plurality of resistances) which makes it possible to generate a difference of potential determined between two oil level measurements made by successive application of a direct current at two separate instants through an input LEVEL of simulation device 110 connected to the module for generating a variable resistance $R_{VAR}$.

Simulation device 110 also comprises a fixed resistance (here with value 100Ω) connected to input TPT of simulation device 110 intended to receive a current from control circuit GCU. In normal operation, the operating temperature of the device is indicated by the resistance (considered from control circuit GCU) actually connected to this input TPT.

Simulation device 110 of FIG. 3 also comprises the components already described with reference to FIG. 1.

In particular, the current applied by control circuit GCU to input $I_{exc}$ actuates a circuit LR (equivalent to reference 12 of FIG. 1) and is measured by a current detector SENS (equivalent to reference 13 of FIG. 1) on the basis of which a command logic LOGIC opens or closes a controlled switch (or "virtual switch") CV interposed between a supply voltage generator GEN (here three-phase) and the supply outputs of simulation device 110.

It is noted that, as subsequently explained, operation of the command logic LOGIC is activated by a signal TRIP transmitted by command module COM already mentioned.

Simulation device 110 also comprises a current transformer CT able to measure the currents on the three phases that have just been mentioned and to transmit the corresponding measurement information items on an output GEN CT intended for control circuit GCU.

FIG. 4 shows the steps leading to opening of the controlled switch or virtual switch.

This method begins in step E40 at which the virtual switch is assumed to be closed and a signal POWER READY (transmitted from control circuit GCU to simulation device 110 is active. Simulation device 110 therefore delivers a supply to the selected electrical power center.

Upon detection of a descending front on the SIGNAL POWER READY (that is to say when the signal becomes inactive)), command module COM transmits a request for opening of virtual switch CV sent to command logic LOGIC via signal TRIP (for example for a duration of 5 seconds) in step E44.

Command logic LOGIC then sends to controlled switch or virtual switch CV a signal commanding the opening thereof (step E46). When a controlled switch with self-holding is involved, the command is a command for opening of the self-holding of the switch.

FIG. 5 shows the steps leading to closing of the virtual switch.

A step E50 therefore is considered, during which simulation device 110 and the associated control circuit do not contain any fault signal (in particular by virtue of the generation of simulated signals by simulation device 110 as already indicated). The power source or supply generator GEN also is ready to function.

Command module COM then transmits a start-up command via the signal SIM START in step E52.

As already indicated, this signal starts the phase of simulation of voltage PMG by generator SIMUL PMG in step E54.

In the first instants after start-up, the voltage simulated by generator SIMUL PMG has a frequency lower than the threshold already mentioned, so that simulation device 110 generates a signal PRESS representative of a pressure lower than the low-pressure threshold.

The frequency of simulated voltage PMG then continues to increase (as a result of the ramp indicated above) and reaches a threshold in step E58 starting from which relay REL of simulation device 110 is closed and thus generates at the output a pressure signal PRESS representative of a normal oil pressure (step E60).

Furthermore, control circuit GCU also monitors the frequency of voltage PMG simulated by generator SIMUL PMG and generates at a given moment (such as defined for normal operation) an excitation current $I_{exc}$ applied to the corresponding input of simulation device 110 (step E62).

Excitation current $I_{exc}$ is detected by current sensor SENS which brings about, through command logic LOGIC, closing of the virtual switch in step E64, typically when the measured excitation current $I_{exc}$ exceeds the threshold value already mentioned.

Closing of the virtual switch makes it possible to deliver the power from supply generator GEN to the electrical power center to which simulation device 110 is connected.

Finally, in the case of a self-holding virtual switch (as already mentioned), the self-holding then is engaged so as to keep the virtual switch closed irrespective of the excitation current (step E66).

It is noted that control circuit GCU then generates a signal POWER READY (mentioned with reference to FIG. 4) active as soon as the electrical power center of the equipment item concerned receives voltage from simulation device 110.

The above embodiments are only conceivable examples of implementation of the invention, which is not limited thereto.

The invention claimed is:

1. A simulation device that simulates an alternator connectable to an alternator control circuit of a piece of equipment and that is configured to supply voltage to an electrical network of the piece of equipment, the simulation device comprising:
   circuitry that receives an excitation current generated by the alternator control circuit of the piece of equipment, and that outputs a voltage signal to the alternator control circuit of the piece of equipment; and
   a switch, controlled based on the excitation current received by said circuitry, that supplies the voltage, from voltage supply circuitry, to the electrical network of the piece of equipment to simulate the alternator.

2. The simulation device according to claim 1, further comprising:
   a current sensor that measures the excitation current; and
   command circuitry that controls the switch based on the excitation current measured by the current sensor.

3. The simulation device according to claim 2, wherein the command circuitry is configured to control closing of the switch when the excitation current measured by the current sensor exceeds a predetermined threshold.

4. The simulation device according to claim 1, further comprising an inductive circuit to which the excitation current is applied.

5. The simulation device according to claim 1, wherein said circuitry includes delivery circuitry that delivers a variable voltage signal as the voltage signal to the alternator control circuit to determine the excitation current.

6. The simulation device according to claim 1, wherein said circuitry includes variable voltage generating circuitry that generates and outputs a variable voltage signal as the voltage signal to the alternator control circuit.

7. The simulation device according to claim 6, wherein said circuitry includes delivery circuitry that delivers the variable voltage signal to the alternator control circuit to determine the excitation current.

8. A simulation system comprising a simulation device according to claim 1 and the alternator control circuit, wherein the alternator control circuit includes circuitry configured to determine the excitation current based on a value representative of the voltage signal received from said circuitry at the alternator control circuit.

9. The simulation system according to claim 8, wherein the simulation device is configured to supply a signal to a first equipment item.

10. The simulation system according to claim 9,
    wherein the simulation device is connected to the first equipment item through a switching box, and
    wherein an alternator is connected to a second equipment item through the switching box.

11. The simulation device according to claim 1, further comprising:
    command circuitry,
    wherein the excitation current is received by said circuitry, and
    wherein the switch is controlled by the command circuitry to close when the excitation current received by said circuitry exceeds a predetermined threshold, and to open when the command circuitry receives a dedicated information item from the alternator control circuit.

12. The simulation device according to claim 1, wherein the switch is a virtual switch.

13. The simulation device according to claim 1, wherein the voltage supplied to the electrical network is a three-phase voltage.

14. A control method of controlling a device that simulates an alternator connectable to an alternator control circuit of a piece of equipment and that is configured to supply voltage to an electrical network of the piece of equipment, the control method comprising:

receiving an excitation current generated by the alternator control circuit;

outputting a voltage signal to the alternator control circuit of the piece of equipment; and controlling a switch, based on the excitation current, to supply the voltage, from voltage supply circuitry, to the electrical network of the piece of equipment to simulate a voltage applied by the alternator.

15. The control method according to claim 14, wherein said controlling the switch includes closing the switch, said closing the switch being commanded when the excitation current exceeds a predetermined threshold.

16. The control method according to claim 14,
wherein the voltage signal is a variable voltage signal, the method further comprising:
delivering the variable voltage signal to the alternator control circuit to determine the excitation current.

17. In a simulation device that simulates an alternator connectable to an alternator control circuit, the improvement in the simulation device comprising:

a circuit, of the simulation device, that receives an excitation current generated by the alternator control circuit; and a switch, of the simulation device, which is controlled based on the excitation current, and which outputs a voltage to an electrical network external to the simulation device.

18. The simulation device according to claim 17, further comprising:

a current sensor that measures the excitation current; and
command circuitry that controls the switch based on the excitation current measured by the current sensor.

19. The simulation device according to claim 17, further comprising:

command circuitry,
wherein the excitation current is received by the circuit of the simulation device that receives the excitation current generated by the alternator control circuit, and
wherein the switch is controlled by the command circuitry to close when the excitation current received by the circuit exceeds a predetermined threshold, and to open when the command circuitry receives a dedicated information item from the alternator control circuit.

20. The simulation device according to claim 17, further comprising delivery circuitry that delivers the voltage signal to the alternator control circuit to determine the excitation current, the voltage signal being a variable voltage signal.

* * * * *